(12) United States Patent
Frazier et al.

(10) Patent No.: US 8,899,018 B2
(45) Date of Patent: Dec. 2, 2014

(54) OPTIMIZED EXHAUST AFTER-TREATMENT INTEGRATION

(75) Inventors: Tim Frazier, Columbus, IN (US); Eric Andrews, Columbus, IN (US); Ken Federle, Columbus, IN (US)

(73) Assignee: Cummins Inc., Columbus, IN (US)

(*) Notice: Subject to any disclaimer, the term of this patent is extended or adjusted under 35 U.S.C. 154(b) by 2238 days.

(21) Appl. No.: 11/655,268

(22) Filed: Jan. 19, 2007

(65) Prior Publication Data
US 2007/0245714 A1 Oct. 25, 2007

Related U.S. Application Data

(63) Continuation-in-part of application No. 11/334,735, filed on Jan. 19, 2006, now Pat. No. 7,861,518.

(51) Int. Cl.
*F01N 3/00* (2006.01)
*F02D 41/00* (2006.01)
*F01N 3/20* (2006.01)
*F02D 41/14* (2006.01)
*F02D 41/02* (2006.01)

(52) U.S. Cl.
CPC ......... *F02D 41/005* (2013.01); *F01N 2900/12* (2013.01); *F01N 2900/1812* (2013.01); *F02D 41/1406* (2013.01); *F01N 2900/1814* (2013.01); *F02D 2200/0625* (2013.01); *F01N 2610/146* (2013.01); *F01N 2900/102* (2013.01); *F01N 2610/02* (2013.01); *F02D 41/0235* (2013.01); *F01N 3/208* (2013.01); *Y02T 10/47* (2013.01); *F01N 2900/08* (2013.01); *Y02T 10/24* (2013.01)
USPC ................... 60/285; 60/295; 60/301

(58) Field of Classification Search
USPC .................. 60/273, 284–287, 301
See application file for complete search history.

(56) References Cited

U.S. PATENT DOCUMENTS

| | | | |
|---|---|---|---|
| 4,063,072 A | 12/1977 | Sochtig et al. | |
| 4,926,331 A | 5/1990 | Windle et al. | |
| 5,116,579 A * | 5/1992 | Kobayashi et al. | ........... 422/111 |
| 5,280,756 A * | 1/1994 | Labbe | ........... 110/191 |
| 5,788,936 A | 8/1998 | Subramanian et al. | |
| 5,842,341 A | 12/1998 | Kibe | |
| 5,924,280 A | 7/1999 | Tarabulski | |
| 5,968,464 A | 10/1999 | Peter-Hoblyn et al. | |
| 6,119,448 A | 9/2000 | Emmerling et al. | |
| 6,151,547 A | 11/2000 | Kumar et al. | |
| 6,343,468 B1 | 2/2002 | Doelling et al. | |
| 6,352,490 B1 * | 3/2002 | Makki et al. | ............ 477/78 |
| 6,363,771 B1 * | 4/2002 | Liang et al. | ......... 73/23.31 |
| 6,662,553 B2 | 12/2003 | Patchett et al. | |
| 6,681,565 B2 * | 1/2004 | Russell | ........... 60/286 |

(Continued)

OTHER PUBLICATIONS

International Search Report, PCT/US07/001480, Sep. 16, 2008.

*Primary Examiner* — Jesse Bogue
(74) *Attorney, Agent, or Firm* — Foley & Lardner LLP

(57) ABSTRACT

Through the use transfer functions, or other modeling types, directed toward the individual operation of an engine and after-treatment subsystems, an optimizer determines the trade-offs between fuel consumption, urea consumption, and reduction of NOx and PM emissions for each component of the integrated system. Evaluation of these trade-offs permits the optimizer to dictate how each component should be controlled, or adjusted, to achieve optimal fuel (and urea) consumption while meeting the constraints bounding the solution. Response characteristics can be triggered by adjusting certain engine operating levers in order to achieve optimal performance of the integrated system.

5 Claims, 9 Drawing Sheets

(56) References Cited

U.S. PATENT DOCUMENTS

| | | |
|---|---|---|
| 6,742,330 B2 | 6/2004 | Genderen |
| 6,813,884 B2 | 11/2004 | Shigapov et al. |
| 6,868,294 B2 | 3/2005 | Kouno et al. |
| 6,895,747 B2 | 5/2005 | Upadhyay et al. |
| 2003/0200022 A1 | 10/2003 | Streichsbier et al. |
| 2004/0128982 A1* | 7/2004 | Patchett et al. ............ 60/274 |
| 2005/0056004 A1 | 3/2005 | Kakwani et al. |
| 2005/0124459 A1* | 6/2005 | Ito ............................ 477/43 |

* cited by examiner

| RESPONSE CHARACTERISTICS | COMMON RAIL FUEL SYSTEM | | | | | | AIR HANDLING | | | | CYL. MANAGEMENT | |
|---|---|---|---|---|---|---|---|---|---|---|---|---|
| | SOI | Quantity of fuel injected | SAC pressure | Rate shape | Multiple injection | In-cylinder dosing | VGT | EGR valve | Intake throttle | Exhaust throttle | Intake valve | Exhaust valve |
| Adjust turbine inlet temperature (TIT) | S | S | S | S | S | S | S | S | S | S | S | S |
| Adjust E/O Nox mass flow | S | S | M | M | S | M | S | S | S | S | S | |
| Ajust exhaust mass flow | | M | | | M | M | S | M | S | S | S | |
| adjust E/O PM mass flow | S | S | S | S | S | S | S | S | S | S | | |
| Adjust E/O HC and CO mass flow | S | S | S | S | S | | M | M | M | M | M | |
| Adjust E/O NO/NO2 | S | S | M | M | S | | M | M | M | M | M | |
| Adjust engine load (parasitic control) | | | | | | | | | | | | |

E/O = engine out
S = strong influence on response characteristic
M = moderate influence on response characteristic
blank = secondary impact

FIG. 9

OPTIMIZED EXHAUST AFTER-TREATMENT INTEGRATION

CROSS REFERENCE TO RELATED APPLICATIONS

This application is a Continuation-in-Part of U.S. application Ser. No. 11/334,735 filed Jan. 19, 2006, the contents of which are incorporated herein by reference.

BACKGROUND OF INVENTION

1. Technical Field

The present system and method relate generally to the reduction of pollutants from emissions released by automotive engines, and more particularly to the optimization of the operation of an engine and after-treatment devices in order to meet performance and/or emissions criteria.

2. Description of the Related Art

Due to very high thermal efficiencies, the diesel engine offers good fuel economy and low emissions of hydrocarbons (HC) and carbon monoxide (CO). Despite these benefits, more efficient operation of diesel engines results in higher emissions of nitrogen oxides, i.e., NO or $NO_2$, known collectively as NOx. In diesel engines, the air-fuel mixture in the combustion chamber is compressed to an extremely high pressure, causing the temperature to increase until the fuel's auto-ignition temperature is reached. The air-to-fuel ratio for diesel engines is much leaner (more air per unit of fuel) than for gasoline engines, and the larger amount of air promotes more complete fuel combustion and better fuel efficiency. As a result, emissions of hydrocarbons and carbon monoxide are lower for diesel engines than for gasoline engines. However, with the higher pressures and temperatures in the diesel engine, NOx emissions tend to be higher, because the high temperatures cause the oxygen and nitrogen in the intake air to combine as nitrogen oxides.

In addition, as a further disadvantage, diesel engines produce an amount of exhaust particulate matter (PM), or soot, that is comparatively larger than that of gasoline engines. PM is a complex emission that includes elemental carbon, heavy hydrocarbons derived from the fuel and lubricating oil, and hydrated sulfuric acid derived from the fuel sulfur. Diesel particulates include small nuclei mode particles having diameters below 0.4 µm and their agglomerates of diameters up to 1 µm. PM is formed when insufficient air or low combustion temperature prohibits the complete combustion of free carbon. As such, PM is partially unburned fuel or lube oil and is often seen as black smoke.

NOx emissions from diesel engines pose a number of health and environmental concerns. Once in the atmosphere, NOx reacts with volatile organic compounds or hydrocarbons in the presence of sunlight to form ozone, leading to smog formation. Ozone is corrosive and contributes to many pulmonary function problems, for instance.

Moreover, the fine particles that make up PM in diesel exhaust can penetrate deep into the lungs and pose serious health risks including aggravated asthma, lung damage, and other serious health problems. PM from diesel engines also contributes to haze, which restricts visibility.

Due to their damaging effects, governmental agencies have imposed increasingly stringent restrictions for NOx as well as PM emissions. Two mechanisms can be implemented to comply with emission control regulations: manipulation of engine operating characteristics and implementation of after-treatment control technologies.

In general, manipulating engine operating characteristics to lower NOx emissions can be accomplished by lowering the intake temperature, reducing power output, retarding the injector timing, reducing the coolant temperature, and/or reducing the combustion temperature.

For example, cooled exhaust gas recirculation (EGR) is well known and is the method that most engine manufacturers are using to meet environmental regulations. When an engine uses EGR, a percentage of the exhaust gases are drawn or forced back into the intake and mixed with the fresh air and fuel that enters the combustion chamber. The air from the EGR lowers the peak flame temperatures inside the combustion chamber. Intake air dilution causes most of the NOx reduction by decreasing the $O_2$ concentration in the combustion process. To a smaller degree, the air also absorbs some heat, further cooling the process. The use of EGR increases fuel consumption.

In addition to EGR, designing electronic controls and improving fuel injectors to deliver fuel at the best combination of injection pressure, injection timing, and spray location allows the engine to burn fuel efficiently without causing temperature spikes that increase NOx emissions. For instance, controlling the timing of the start of injection of fuel into the cylinders impacts emissions as well as fuel efficiency. Advancing the start of injection, so that fuel is injected when the piston is further away from top dead center (TDC), results in higher in-cylinder pressure and higher fuel efficiency, but also results in higher NOx emissions. On the other hand, retarding the start of injection delays combustion, but lowers NOx emissions. Due to the delayed injection, most of the fuel is combusted at lower peak temperatures, reducing NOx formation.

With EGR engines, one of the key components to emissions control is the turbocharger. Most manufacturers using EGR technology have developed versions of variable geometry turbochargers (VGT), which are designed to regulate the flow of cooled exhaust air back into the combustion chamber, depending on the engine's speed.

The precise amount of exhaust gas that must be metered into the intake manifold varies with engine load. High EGR flow is generally necessary during cruising and mid-range acceleration, when combustion temperatures are typically very high. On the other hand, low EGR flow is needed during low speed and light load conditions. No EGR flow should occur during conditions when EGR could negatively impact engine operating efficiency or vehicle driveability, e.g. during engine warm up, idle, or wide open throttle.

Reducing NOx by manipulating engine operation generally reduces fuel efficiency. Moreover, the mere manipulation of engine operation may not sufficiently reduce the amount of NOx to mandated levels. As a result, after-treatment systems also need to be implemented. In general, catalysts are used to treat engine exhaust and convert pollutants, such as carbon monoxide, hydrocarbons, as well as NOx, into harmless gases. In particular, to reduce NOx emissions, diesel engines on automotive vehicles can employ a catalytic system known as a urea-based selective catalytic reduction (SCR) system. Fuel efficiency benefits of 3 to 10% can result from using SCR systems to reduce NOx rather than manipulating engine operation for NOx reduction which negatively impacts fuel efficiency. Urea-based SCR systems can be viewed according to four major subsystems: the injection subsystem that introduces urea into the exhaust stream, the urea vaporization and mixing subsystem, the exhaust pipe subsystem, and the catalyst subsystem. Several SCR catalysts are available for diesel engines, including platinum, vanadium, and zeolite.

A diesel vehicle must carry a supply of urea solution for the SCR system, typically 32.5% urea in water by weight. The urea solution is pumped from the tank and sprayed through an atomizing nozzle into the exhaust gas stream. Complete mixing of urea with exhaust gases and uniform flow distribution are critical in achieving high NOx reductions.

Urea-based SCR systems use gaseous ammonia to reduce NOx. During thermolysis, the heat of the gas breaks the urea ($CO(NH_2)_2$) down into ammonia ($NH_3$) and hydrocyanic acid (HCNO). The ammonia and the HCNO then meet the SCR catalyst where the ammonia is absorbed and the HCNO is further decomposed through hydrolysis into ammonia. When the ammonia is absorbed, it reacts with the NOx to produce water, oxygen gas ($O_2$), and nitrogen gas ($N_2$). The amount of ammonia injected into the exhaust stream is a critical operating parameter. The required ratio of ammonia to NOx is typically stoichiometric. The ratio of ammonia to NOx must be maintained to assure high levels of NOx reduction. However, the SCR system can never achieve 100% NOx reduction due to imperfect mixing, etc.

A common problem with all SCR systems is ammonia slip. Ammonia slip refers to tailpipe emissions of ammonia that occur when: i) exhaust gas temperatures are too cold for the SCR reaction to occur, or ii) the amount of ammonia introduced into the exhaust stream is more than is required for the amount of NOx present. Ammonia that is not reacted will slip through the SCR catalyst bed and exhaust to the atmosphere. Ammonia slip is a regulated parameter which may not exceed a fixed concentration in the SCR exhaust.

Urea-based SCR catalysts can be very effective in reducing the amount of NOx released into the air and meeting stringent emissions requirements. However, the use of urea-based SCR is met with infrastructure and distribution considerations. As described above, diesel vehicles employing urea-based SCR generally carry a supply of aqueous solution of urea, so a urea distribution system is required to allow vehicles to replenish their supplies of urea. The United States currently has no automotive urea infrastructure. The cost of urea is likely to be volatile in the U.S. even as the first pieces of an infrastructure are put in place, because the development of the urea infrastructure is likely to be slow.

In areas, such as Europe, where the price of diesel fuel is generally much higher than the expected price of urea, the SCR system can use as much urea as necessary to reduce NOx and achieve maximum fuel economy during combustion in the engine, notwithstanding any problems with urea distribution. In contrast, the use of urea in the U.S. will probably be more measured, because the price of urea will be closer to the price of diesel. Moreover, the problems with urea distribution and pricing are coupled with fluctuations in diesel fuel prices.

Although the approaches described hereinabove may be effective in reducing NOx emissions, it is generally difficult to reduce both NOx emissions and PM emissions simultaneously. Conventionally, efforts to reduce NOx through various aspects of engine design tend to increase PM, or vice versa. In particular, very high temperatures in the combustion chamber help reduce PM emissions, but produce higher levels of NOx. On the other hand, lowering the peak temperatures in the combustion chamber reduces the amount of NOx as described previously, but increases the likelihood of PM formation. For example, advancing injection timing creates higher peak cylinder temperatures which burn off PM but produce NOx. Meanwhile, retarding timing reduces temperatures to minimize NOx emissions, but the reduced temperatures result in less complete combustion and increases PM. For similar reasons, the use of EGR to cool lower combustion temperatures increases PM emissions.

Among various engine operating characteristics, PM emissions can be reduced by advancing injection timing, increasing fuel injection pressures, increasing the power output, reducing engine speed, and reducing oil consumption. Additionally, a turbocharger can be employed to increase the charge pressure which allows the engine to operate on a leaner mixture resulting in lower particulate emissions.

After-treatment devices also exist to reduce or remove PM in diesel exhaust. Such after-treatment devices are often required in order to meet both NOx and PM emissions requirements, due to the difficulty of simultaneously reducing NOx and PM emissions by altering engine parameters, such as fuel injection timing. In particular, a diesel oxidation catalyst (DOC) and a diesel particulate filter (DPF) provide effective approaches to purify PM emissions from a diesel engine.

A DOC is a catalytic device that is used in the abatement of HC, CO, and the soluble organic fraction (SOF) of PM in diesel exhaust. A DPF has a filter with very small pores which are designed to remove PM, or soot, from diesel exhaust. Efficiencies for a DPF can be 85%, and even over 90%.

Through a process known as regeneration, many DPF's burn off PM that accumulates on the filter. Regeneration may be accomplished passively by adding a catalyst to the filter. Alternatively, regeneration may be accomplished actively by increasing the exhaust temperature through a variety of approaches, e.g. engine management, a fuel burner, or resistive heating coils. Active systems use extra fuel to cause burning that heats the DPF or to provide extra power to the DPF's electrical system. Running the cycle too often while keeping the back pressure in the exhaust system low, results in extra fuel use.

A DOC may also be used as a heating-device in active regeneration of a DPF. The accumulated PM in the DPF is continuously oxidized by $NO_2$ which is generated by oxidizing NO in a DOC that is upstream of the DPF. Such a system requires accurate control to maintain the mass ratio of NO/PM in engine-out exhaust gas over a critical value. In-cylinder dosing is employed in active regeneration, where fuel injectors add a dose of fuel into the cylinder after the primary combustion has taken place. Unburned fuel is exhausted out of the cylinder downstream to the DOC where it burns and generates additional heat for the DPF. The additional heat in the DPF helps to convert the accumulated PM into ash, which has lower volume.

Engine control modules (ECM's), also known as engine control units (ECU's), control the engine and other functions in the vehicle. ECM's can receive a variety of inputs to determine how to control the engine and other functions in the vehicle. With regard to NOx and PM reduction, the ECM can manipulate the parameters of engine operation, such as EGR and fuel injection.

ECM's can also control the operating parameters of exhaust after-treatment devices, such as a urea-based SCR system, a DOC system, or a DPF system. For instance, an ECM can meter urea solution into the exhaust stream at a rate calculated from an algorithm which estimates the amount of NOx present in the exhaust stream as a function of engine operating conditions, e.g. vehicle speed and load. As a further example, an ECM can monitor one or more sensors that measure back pressure and/or temperature, and based on pre-programmed set points, the ECM activates the regeneration cycle.

SUMMARY OF THE INVENTION

The present invention provides a system and method for optimizing the performance of a system that integrates an engine and an after-treatment (A/T) system. In particular, the performance of the integrated system is optimized while ensuring compliance with required emissions levels. The integrated system operates under a desired speed and fueling command generated by the engine controller in response to an operator's request. As such, a method according to the present invention may be applied under i) steady state or relatively slow transient conditions, or ii) under moderate to rapid transients.

For the integrated system, a method according to the present invention may be employed to achieve the optimal combination of brake specific fuel consumption (BSFC) by the engine and urea consumption by a urea-based selective catalytic reduction (SCR) system, while also complying with required emissions levels and target levels of ammonia ($NH_3$) slip. Additionally, the method may optimize the integrated system while taking into account other emissions and/or performance variables.

Exemplary embodiments of the present invention the use transfer functions, or other modeling types, directed toward the individual operation of the engine and each A/T subsystem. An optimizer then determines the trade-offs between fuel consumption, urea consumption, and reduction of NOx and PM emissions for each component of the integrated system. Evaluation of these trade-offs permits the optimizer to dictate how each component should be controlled, or adjusted, to achieve optimal fuel and urea consumption while meeting the constraints bounding the solution. In particular, response characteristics can be triggered by adjusting certain engine operating levers in order to achieve optimal performance of the integrated system.

These and other aspects of the present invention will become more apparent from the following detailed description of the preferred embodiments of the present invention when viewed in conjunction with the accompanying drawings.

BRIEF SUMMARY OF THE DRAWINGS

FIG. 9 provides a table illustrating certain engine operating parameters that impact specific response characteristics.

DETAILED DESCRIPTION OF THE INVENTION

Engine controllers, such as ECM's, currently do not account for the monetary cost of operating the engine and the monetary cost of operating an after-treatment system. More specifically, price inputs for fuel and reductants, such as urea, are not currently specified for ECM algorithms. As a result, no ECM's, or the vehicles that use them, are able to dynamically adjust the use of fuel and reductants, such as urea, to achieve cost-effective operation of the vehicle while complying with emissions regulations.

The following presents a detailed description of a system and method that determines the optimal operating parameters for an engine and an emissions after-treatment device according to the cost of operating the engine and the after-treatment device. To demonstrate the features of the present invention, the present invention is discussed in terms of an exemplary embodiment implementing an ECM to reduce total NOx exhaust emissions from a diesel engine by determining appropriate operating parameters for engine components and for a urea-based SCR system according to the price of diesel fuel and the price of urea. However, this preferred embodiment is not meant to limit the present invention.

Figure 1:
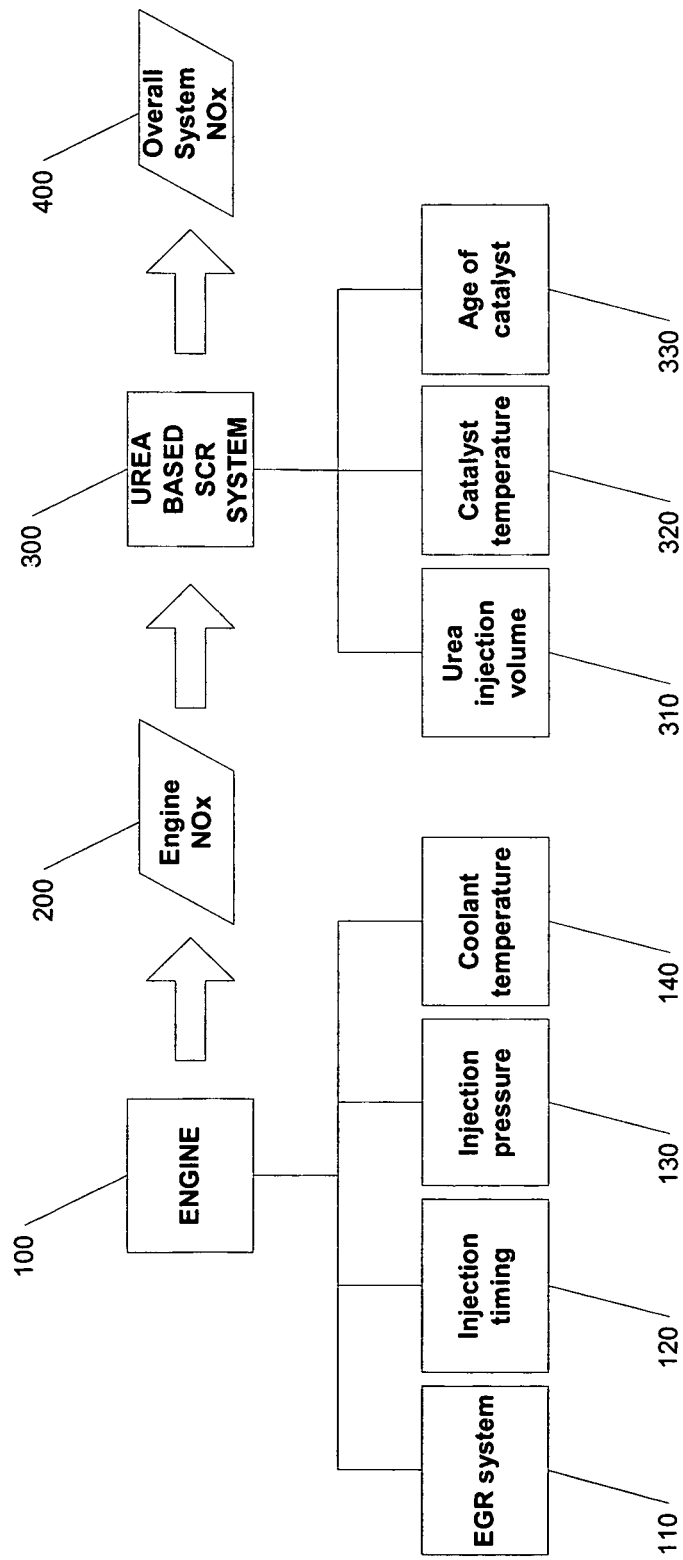
FIG. 1 provides a chart illustrating how the overall system NOx is created according to various characteristics of the engine and a urea-based SCR system.

Referring to FIG. 1 of the accompanying drawings, overall system NOx 400 represents the amount of total NOx exhaust emissions from the entire vehicle, which must fall at or below mandated environmental regulations. Engine NOx 200 represents the NOx exhaust emissions from the operation of the engine 100. The overall system NOx 400 also represents the NOx exhaust emissions that result after the engine NOx 200 passes through the urea-based SCR system 300.

Various characteristics of the engine 100 which can affect the amount of engine NOx 200 include, but are not limited to, the EGR system 110, the injection timing 120, the injection pressure 130, and the coolant temperature 140. These engine attributes are merely representative of the different ways that the engine NOx 200 can be controlled and are provided only as an illustration of how the present invention may be implemented. Moreover, the engine in the present invention generally covers all aspects of the vehicle, not just those related to fuel delivery and combustion, that occur before emissions are exhausted to the after-treatment device, which in turn specifically acts to reduce the pollutants in the emissions.

Various characteristics of the urea-based SCR system 300 which can affect the level of reduction of NOx in the engine NOx 200 include, but are not limited to, the urea injection volume 310, the catalyst temperature 320, and the age of the catalyst 330. These SCR system attributes are merely representative of how the operation of the SCR system 300 can be influenced and are provided only as an illustration of how the present invention may be implemented.

Thus, as summarized in FIG. 1, the operation of engine 100 produces the engine NOx 200, and the amount of engine NOx 200 depends on various characteristics of the engine 100. The engine NOx 200 is then introduced into the SCR system 300 which reduces the amount of NOx in the engine NOx 200 according to the various characteristics of the SCR system 300. The final amount of NOx emissions is the overall system NOx 400.

Figure 2:
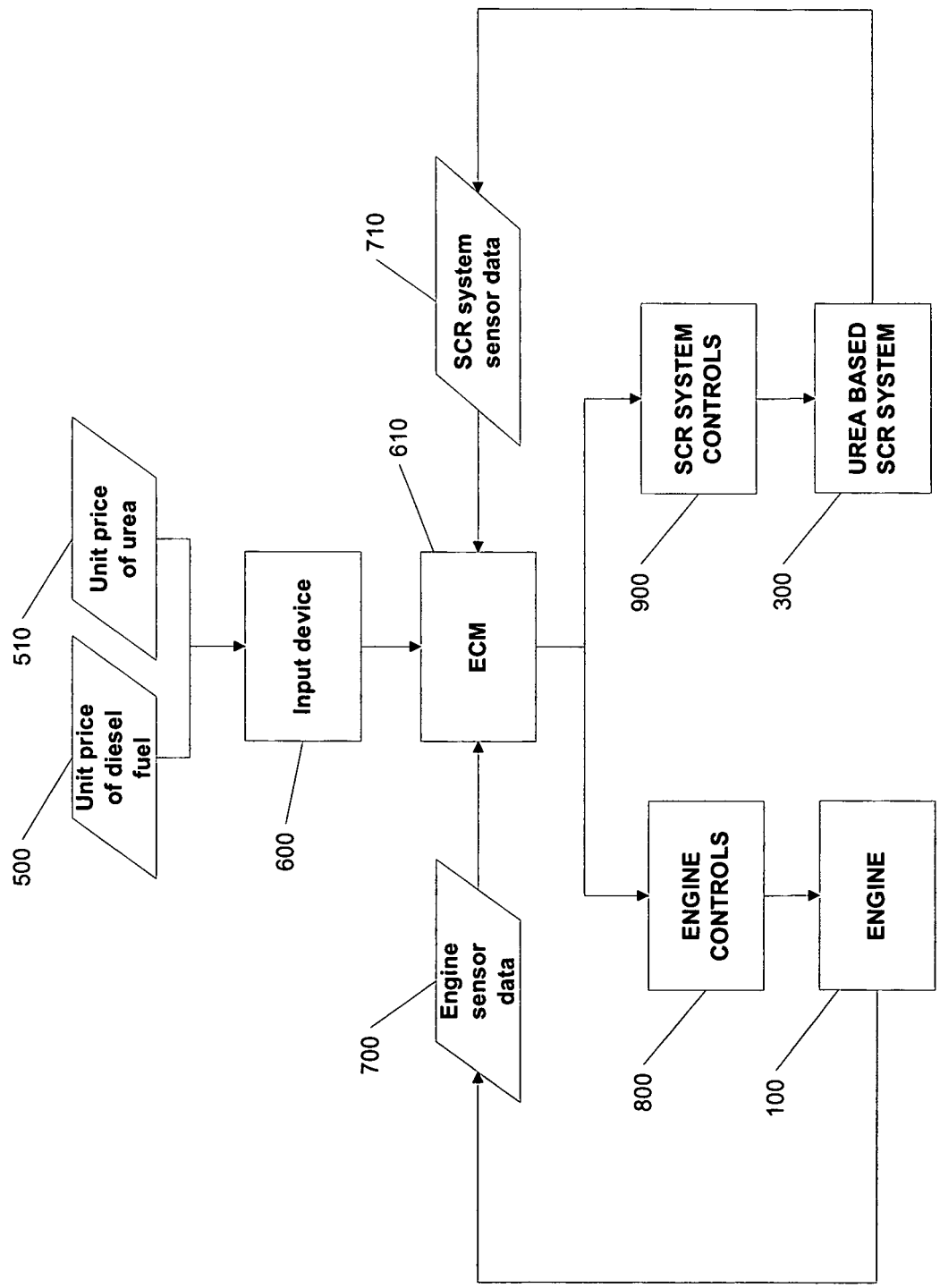
FIG. 2 provides a chart illustrating an exemplary embodiment with the data that are input into an ECM and how output signals are directed.

As shown in the exemplary embodiment of FIG. 2, an ECM 610 is employed for the present invention. The ECM 610 can be one or more microprocessors and other associated components, such as memory devices which store data and program instructions. The ECM 610 generally receives input signals from various sensors throughout the vehicle as well as possible external input data from end users. The ECM 610 then reads the program instructions and executes the instructions to perform data monitoring, logging, and control functions in accordance with the input signals and external input data. The ECM 610 sends control data to an output port which relays output signals to a variety of actuators controlling the engine or the SCR system, generally depicted by the engine controls 800 and the SCR system controls 900. In general, the present invention can be implemented with most commercially available ECM's and no changes to the ECM will be required. Although this exemplary embodiment includes an ECM, any system of controlling operation of engine components and after-treatment devices according to specified instructions may be employed to implement the present invention.

According to the exemplary embodiment of the present invention, the end user or some input mechanism transmits the unit price of diesel fuel 500 and the unit price of urea 510 as input parameters into the ECM 610 through the input device 600. The input device 600 may include, but is not limited to, a computer, personal digital assistant (PDA), or other entry device with a data link connected physically, wirelessly, or by any data transmission method, to the ECM 610. Moreover, the input device 600 may include an automated system or network which transmits data to the ECM 610. Automatic updates are particularly advantageous where the unit price of diesel fuel 500 and the unit price of urea 510 may change frequently. If no input parameters are entered, the ECM can use default settings that reflect the most likely prices for diesel fuel and urea.

After receiving the unit price of diesel fuel 500 and the unit price of urea 510, the ECM 610 determines whether it is more cost-effective to increase NOx reduction with the engine 100 or with the SCR system 300. The engine sensor data 700 from the engine 100 and the SCR system sensor data 710 from the SCR system 300 provide additional input for the ECM 610 to determine optimal operating parameters and to allow the system to change the parameters dynamically according to changing conditions. The engine sensor data 700 provides the ECM. 610 with data, such as engine speed and load, required to calculate current fuel consumption, so that the ECM 610 can compute the current cost of fuel consumption using the unit price of diesel fuel 500. In addition, the SCR sensor data 710 provides the ECM 610 with data required to calculate current urea consumption, such as the amount of engine NOx 200, so that the ECM 610 can compute the current cost of urea consumption using the unit price of urea 510. Moreover, the ECM 610 receives data from a sensor in the SCR system outflow that indicates overall system NOx to ensure that the operating parameters are adjusted in compliance with environmental regulations. Based on the cost calculations, the ECM 610 then sends output signals to the engine controls 800 and the SCR system controls 900 directing how the engine 100 and the SCR system 300 should operate to optimize NOx reduction. As the engine sensor data 700 and the SCR system sensor data 710 change, the cost calculations may change requiring the ECM 610 to adjust its output signals.

Figure 3:
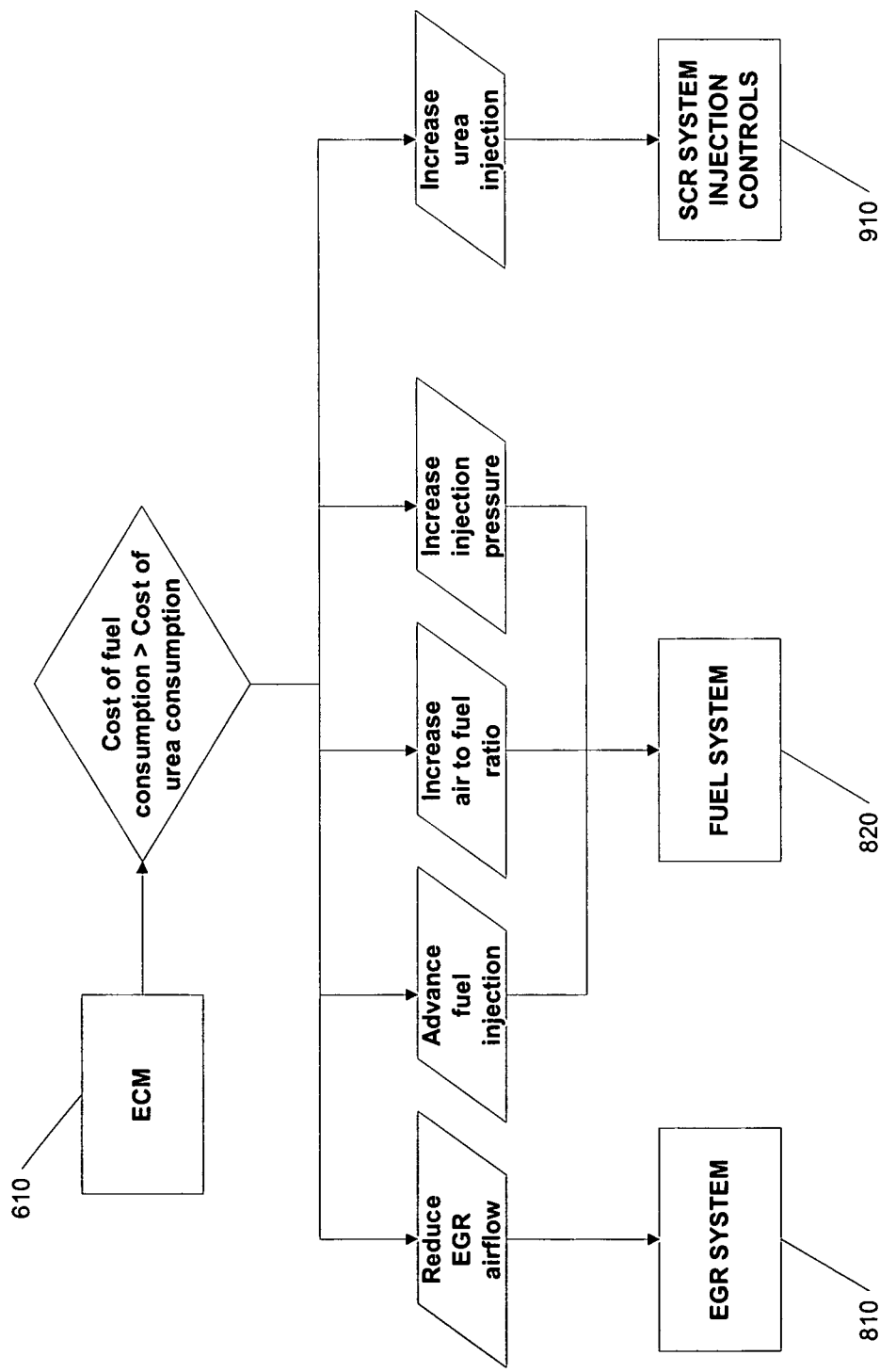
FIG. 3 provides a chart illustrating exemplary output signals from the ECM to maximize fuel efficiency when the cost of operating the engine is higher than the cost of operating the SCR system.

If the current cost of fuel consumption is higher than the current cost of urea consumption, the ECM 610 will attempt to maximize fuel efficiency by maintaining a high temperature at combustion. For example, as shown in FIG. 3, the ECM 610 can maximize fuel efficiency by reducing the flow of cooled exhaust air back into the combustion chamber. The ECM 610 monitors signals from sensors indicating the RPM of the turbocharger in EGR system 810 and sensors indicating engine speed and directs the EGR system 810 to adjust the airflow to increase fuel efficiency.

In addition, the ECM 610 can send signals to calibrate the fuel system 820 to maximize fuel efficiency. The ECM 610 can control the rate of fuel delivery and the timing of injection through actuators. The ECM 610 can also control the pressure at which the fuel is injected. Advancing the fuel injection, increasing the pressure of injection, and making the air-fuel mixture leaner can be controlled alone or in combination to effect an increase in fuel efficiency. An engine speed signal may be a necessary sensor input for the ECM 610 to properly regulate the fuel system 820.

Meanwhile, since the higher temperatures during combustion increase the engine NOx 200, the ECM 610 can direct the SCR system injection controls 910 to increase the amount of urea injected into the SCR system 300 to reduce overall system NOx 400 and ensure compliance with environmental regulations.

Figure 4:
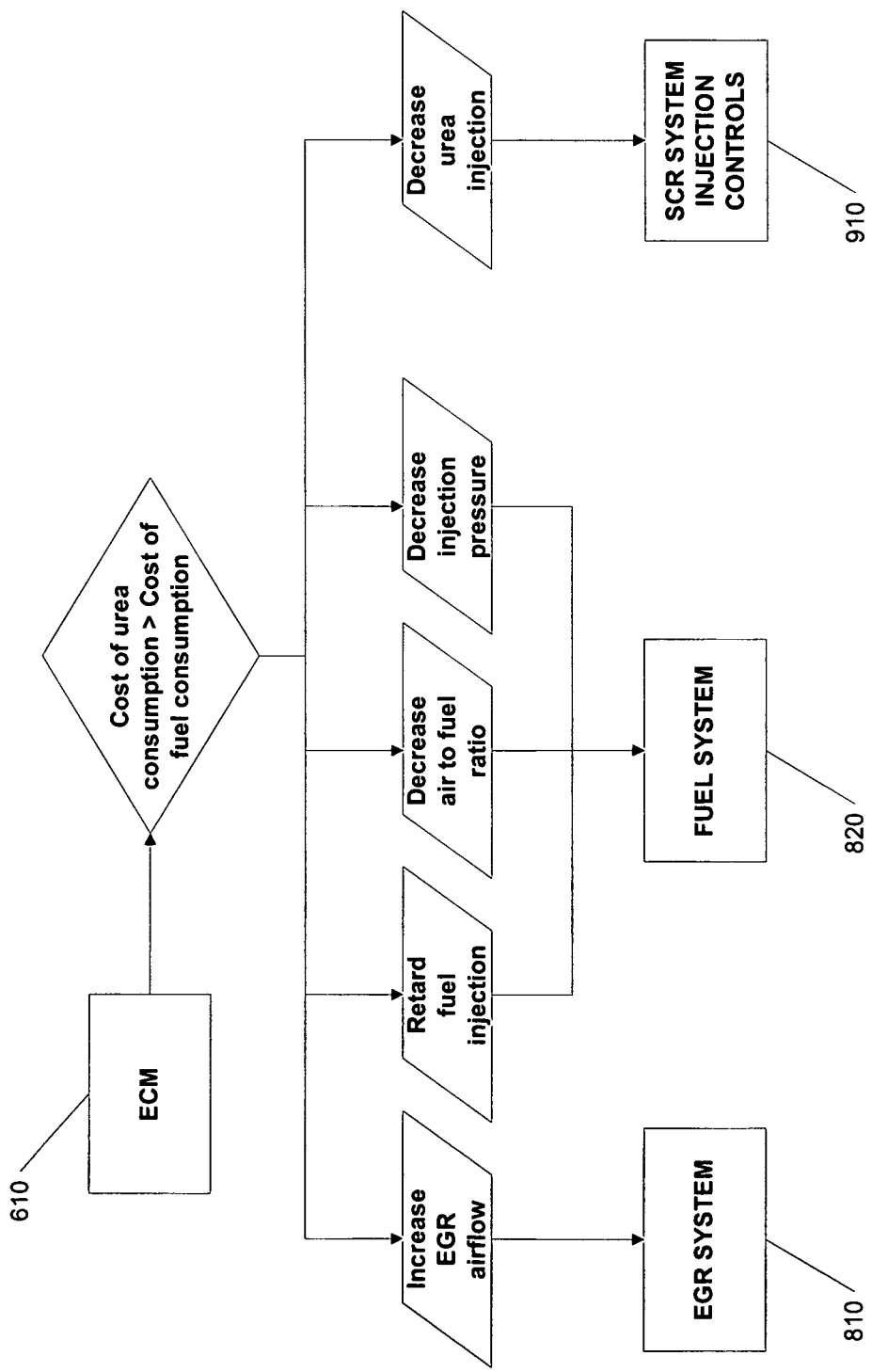
FIG. 4 provides a chart illustrating exemplary output signals from the ECM to minimize urea usage when the cost of operating the engine is lower than the cost of operating the SCR system.

On the other hand, if the current cost of urea consumption is higher than the current cost of fuel consumption, the ECM 610 will attempt to minimize the need for urea by lowering the temperature at combustion and reducing the engine NOx 200. For example, as shown in FIG. 4, the ECM 610 can minimize the engine NOx 200 by increasing the flow of cooled exhaust air back into the combustion chamber. The ECM 610 monitors signals from sensors indicating the RPM of the turbocharger in EGR system 810 and sensors indicating engine speed and directs the EGR system 810 to adjust the airflow to decrease the formation of NOx in the combustion chamber.

In addition, the ECM 610 can calibrate the fuel system 820 to minimize the need for urea. The ECM 610 can control the rate of fuel delivery and the timing of injection through actuators. The ECM 610 can also control the pressure at which the fuel is injected. Retarding the fuel injection, decreasing the pressure of injection, and making the air-fuel mixture less leaner all help to increase fuel efficiency. An engine speed signal may be a necessary sensor input for the ECM 610 to properly regulate the fuel system 820.

Since the lower temperatures during combustion minimize the engine NOx 200, the ECM 610 can direct the SCR system injection controls 910 to reduce the amount of urea injected into the SCR system 300 since less urea is needed to comply with environmental regulations. It is also understood, however, that urea usage likely cannot be completely avoided, since there may be limits to the amount that the engine NOx 200 can be reduced.

A sensor may also be required to monitor ammonia slip to make sure that too much urea is not being introduced and to ensure compliance with regulations governing ammonia slip.

FIGS. 3 and 4 are only exemplary in nature. Controlling the EGR system and the fuel system in the manner described above are only examples of how to affect the combustion temperature and thereby control the amount of NOx. There are also other ways of controlling the amount of urea needed in the SCR system. The examples provided are not intended to limit the methods by which combustion temperature or urea usage are controlled. Moreover, the ECM 610 does not have to adjust all the available operating parameters that affect fuel efficiency and NOx emissions. For instance, the ECM 610 may be able to increase fuel efficiency without having to increase urea usage if the SCR sensor data 710 indicates that the overall system NOx 400 will remain at or below mandated limits after the adjustment. Thus, the ECM 610 might only send signals to adjust engine controls 800. Similarly, if the overall system NOx 400 will remain at or below mandated limits, the ECM can send signals to the SCR system injection controls 910 to reduce the amount of urea injected into the SCR system 300 without having to reduce fuel efficiency.

Figure 5:
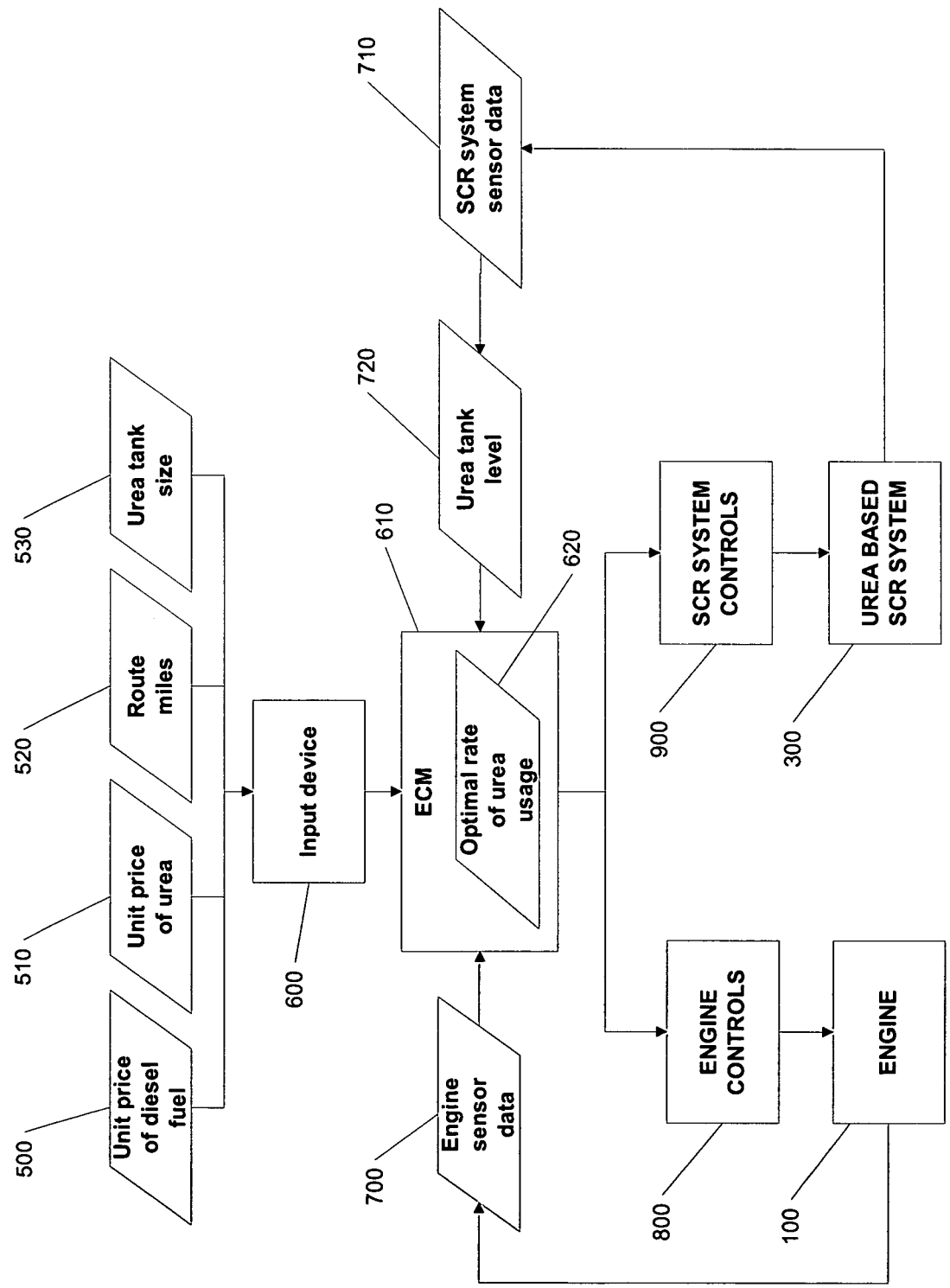
FIG. 5 provides a chart illustrating another embodiment of the present invention which utilizes additional input regarding the urea supply.

FIG. 5 illustrates an additional embodiment of the present invention where the route miles 520 and the starting supply of urea 530 may also be entered via input device 600 into ECM 610. The ECM 610 determines an optimal rate of urea usage 620 which represents the greatest rate of urea consumption that will allow the vehicle to travel the route miles 520 with the starting supply of urea 530 without completely depleting the supply. The ECM 610 can then prevent complete depletion of urea by ensuring that its output signals to the SCR system do not require the SCR system to use more urea than this optimal rate of urea usage 620. Preventing complete depletion eliminates the need to rely on an unreliable urea distribution infrastructure to refill urea tanks or to make unscheduled stops to replenish. Moreover, it is likely to be more cost-effective for fleets to utilize their own supplies of urea.

Figure 6:
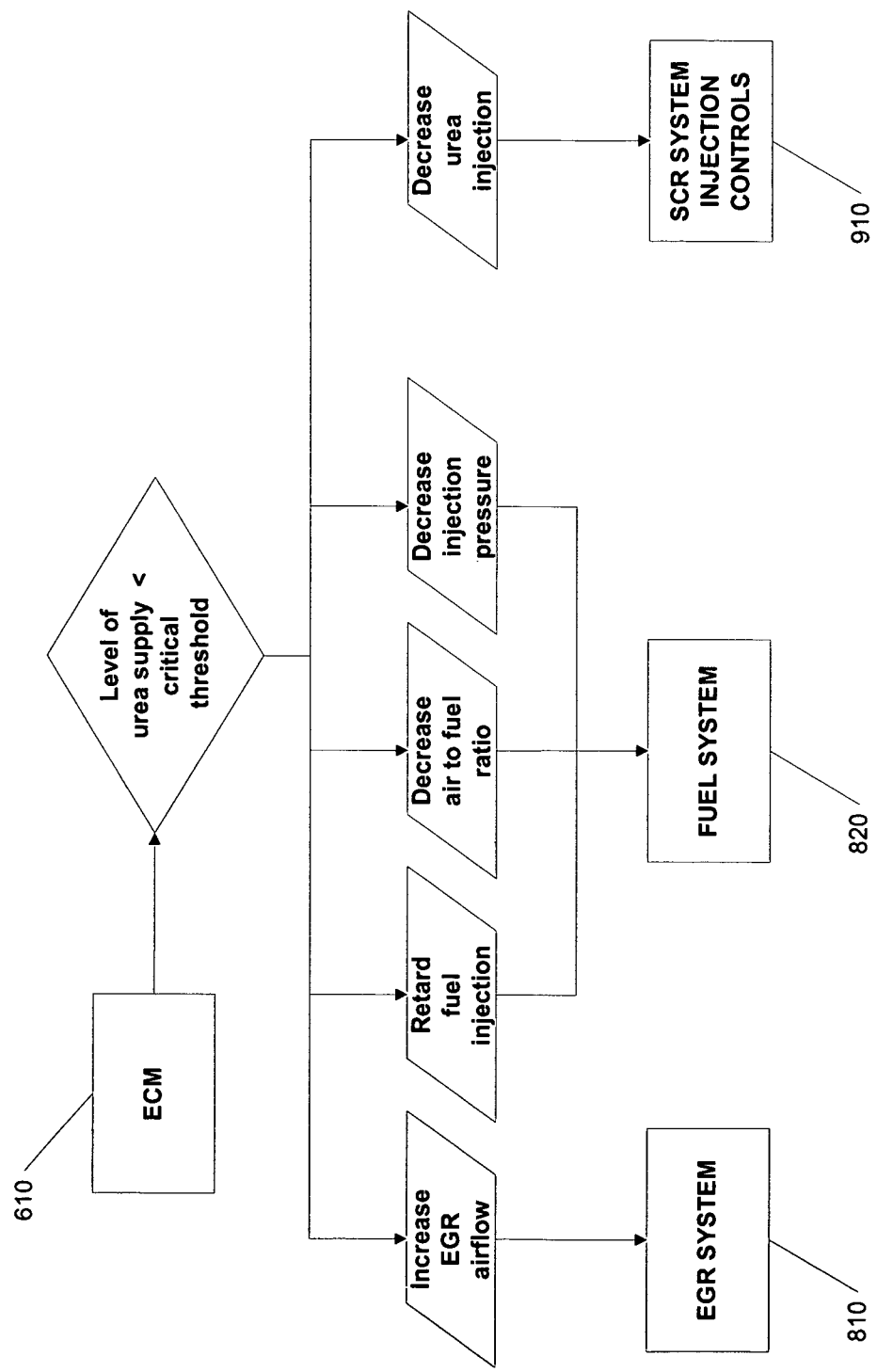
FIG. 6 provides a chart illustrating exemplary output signals from the ECM to minimize urea usage when the supply of urea usage drops below a critical threshold level.

Additionally, the ECM 610 can also receive sensor data regarding the level of urea in the tank 720 so that when the amount of available urea reaches a critical level, the ECM 610 minimizes urea consumption in order to prevent complete depletion, which may cause the engine to derate. If the urea level falls below a critical threshold level, the ECM 610 can reduce the use of urea and maintain a certain level of NOx emissions by adjusting the engine operating parameters and as depicted in FIG. 6. For example, the EGR airflow is increased, the fuel injection timing is retarded, the air-to-fuel ratio is decreased, and/or the fuel injection pressure is decreased, while the volume of urea injected by the SCR system is decreased. The actions illustrated in FIG. 6 can override the operating parameters that take the cost of fuel and urea into account. Indeed, reducing the use of urea according to the level of the urea supply or measuring urea usage according to an optimal rate of urea usage can be implemented without determining the costs of operating the engine or the SCR system.

The description provided in reference to FIGS. 1-6, in particular, explains how an ECM is implemented to reduce total NOx exhaust emissions from a diesel engine by determining appropriate operating parameters for engine components and for a urea-based SCR system according to the price of diesel fuel and the price of urea. It is understood, however, that a diesel engine may be integrated with other after-treatment (A/T) devices in addition to a urea-based SCR system. In particular, A/T devices that are directed toward reducing PM emissions may be employed. An example is illustrated by the integrated system 1000 in FIG. 7.

Figure 7:
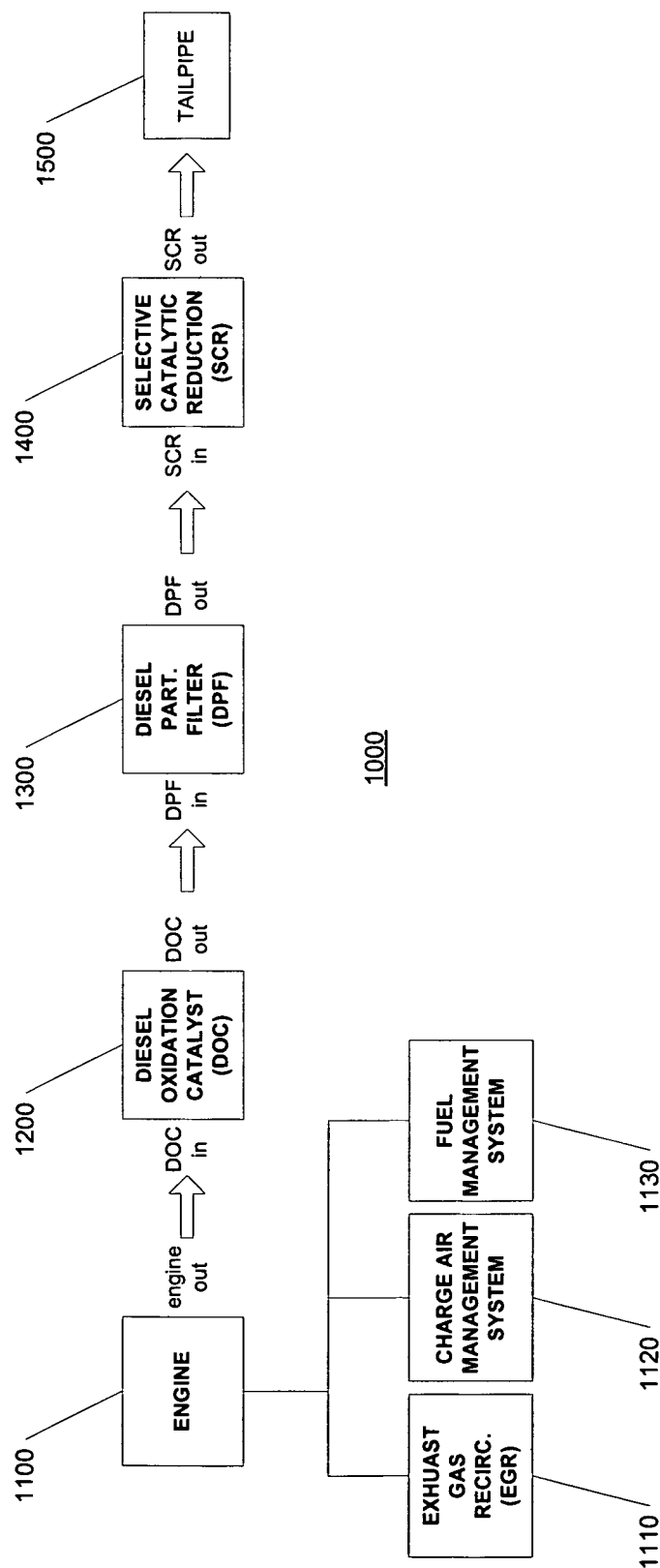
FIG. 7 provides a chart illustrating an exemplary system that integrates an engine with a DOC system, a DPF system, and an SCR system.

Thus, further embodiments of the present invention provide a method for optimizing the performance of a system that integrates an engine and several after-treatment (A/T) devices, as shown in FIG. 7. Specifically, the performance of the integrated system is optimized while ensuring compliance with required emissions levels. The integrated system operates under a desired speed and fueling command generated by the engine controller in response to an operator's request. As such, a method according to the present invention may be applied under i) steady state or relatively slow transient conditions, or ii) under moderate to rapid transient conditions. Moderate to rapid transient conditions may occur when the engine duty cycle is changing, when the A/T system is warming up, or when the A/T is responding thermally to a change in engine duty.

Figure 8:
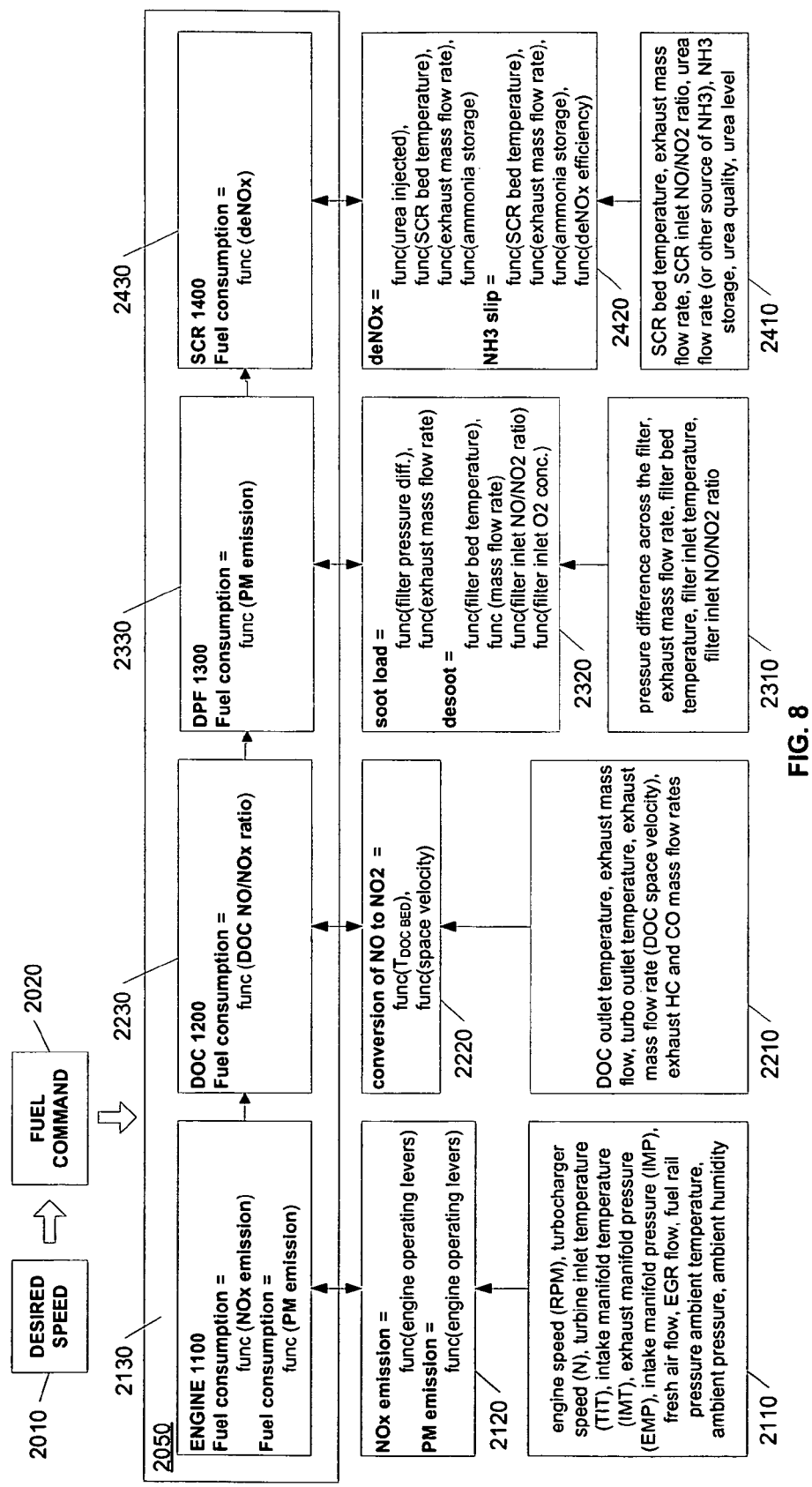
FIG. 8 provides a chart illustrating the inputs into an optimizer that adjusts operating parameters of the system illustrated in FIG. 7 to meet performance and emissions requirements.

For the integrated system 1000 of FIG. 7, an embodiment of the present invention is be employed to achieve the optimal combination of brake specific fuel consumption (BSFC) by the engine and urea consumption by a urea-based selective catalytic reduction (SCR) system, while also complying with required emissions levels and target levels of ammonia ($NH_3$) slip. Additionally, the method may optimize the integrated system while taking into account other emissions and/or performance variables such as:

transient engine load/speed in response to operator demand
peak power delivery at current ambient conditions
transient thermal response of the A/T subsystems, which affects NOx reduction
current status of the diesel particulate filter (DPF), which affects system performance
urea supply level, which affects urea consumption by the SCR system
relative price differences between urea and fuel, which affects the monetary cost of operating the engine and the SCR system
regeneration of the diesel particulate reduction (DPR) system, which affects engine-out conditions In the exemplary embodiment of FIG. 7, an exhaust gas recirculation (EGR) system 1110 is used in conjunction with the base engine charge air management system 1120 and fuel management system 1130 to regulate NOx and PM emissions from the engine 1100. Additionally, the subsystems of the overall A/T system in the integrated system 1000 include a diesel oxidation catalyst (DOC) system 1200, a DPF system 1300, and a urea-based SCR system 1400. An optimizer 2050, as illustrated in FIG. 8, determines optimal performance of the subsystems 1200, 1300, 1400 as well as the engine 1100, in view of emissions requirements. The optimizer 2050 may be employed as a part of an ECM, as described previously. The integrated system operates under a desired speed 2010 and fueling command 2020 generated by the engine controller in response to an operator's request. Through the use of transfer functions, or other modeling types, directed toward the individual operation of the engine 1100 and each A/T subsystem 1200, 1300, 1400, the optimizer 2050 determines the trade-offs between fuel consumption, urea consumption, and reduction of NOx and PM emissions for each component of the integrated system. Evaluation of these trade-offs permits the optimizer 2050 to dictate how each component should be controlled, or adjusted, to achieve optimal fuel and urea consumption while meeting the constraints bounding the solution.

As illustrated in FIG. 8, to determine the current state of the engine 1100, measurements 2110 are obtained, for example, for engine speed (RPM), turbocharger speed (N), the turbine inlet temperature (TIT), the intake manifold temperature (IMT), the exhaust manifold pressure (EMP), the intake manifold pressure (IMP), fresh air flow, EGR flow, fuel rail pressure the ambient temperature, the ambient pressure, and the ambient humidity. In general, the measurements are obtained directly from corresponding sensors, or are indirectly derived (virtually sensed) from other measurements. As an example, EGR may be determined from measuring the temperature of exhaust upstream of the turbocharger and the pressure drop across an orifice located in the EGR path connecting the exhaust flow to the intake flow.

Transfer functions 2120, in the form of embedded models, provide NOx and PM emissions as a function of engine operating levers, e.g., NOx emissions versus EGR, SOI, IMT, etc. FIG. 9 lists certain engine operating parameters, also referred to as engine operating levers, and indicates their influence on specific response characteristics. The operating parameters in FIG. 9 are directed to aspects of the integrated system that include the common rail fuel system, air handling, and cylinder management.

The transfer function models 2120 are developed as part of the engine system calibration development process. In general, an embedded model may be stored as a computer-readable lookup table or as a detailed multi-input, multi-output model. Thus, the future NOx and PM emissions tradeoffs against engine performance are estimated by evaluating the models using information regarding the current state of the engine system and future changes in engine lever positions. In other words, the embedded models are employed to determine the optimum future operating state of the system in response to changing conditions and operator requests.

It is noted that while an embedded model is employed in the embodiments described herein, the transfer functions 2120 can also be derived from actual measured results from sensors during operation or during initial calibration of the system.

Because engine levers such as EGR flow and SOI impact fuel consumption, cost/response functions 2130 are derived for fuel consumption as a function of NOx emissions and as a function of PM emissions. Information regarding these cost/response functions 2130 is passed to the integrated system optimizer 2050, where they are used as part of an overall control strategy to meet the optimization requirements. One aspect of the optimization process is evaluating the tradeoff involved in controlling NOx and PM emissions simultaneously, as well as considering fuel consumption.

FIG. 9 shows that SOI timing, quantity of fuel injection, multiple injections, the variable geometry turbocharger (VGT) rack position, the EGR valve position, intake throttle position, exhaust throttle position, the intake valve timing, or any combination thereof may be adjusted to achieve a certain engine-out NOx mass flow. FIG. 9 also shows that, to a lesser degree (moderate influence), the injector (SAC) pressure, rate shape, and in-cylinder dosing may also be adjusted to achieve the engine-out NOx. As indicated previously, the embedded models above indicate how the engine-out emissions respond to changes in engine lever positions.

To determine the current state of the DOC system 1200, measurements 2210 are determined for the DOC outlet temperature, exhaust mass flow, turbo outlet temperature, exhaust mass flow rate (DOC space velocity), and exhaust HC and CO mass flow rates. In a preferred embodiment, the embedded model uses information regarding the turbo outlet conditions and exhaust HC and CO flow rates to determine the DOC bed temperature. To those of skilled in the art, there are many ways to define the bed temperature. The bed temperature may represent an ensemble of many bed temperature measurements or predictions.

A transfer function 2220, in the form of an embedded model, provides information regarding the conversion of NO to NO2 versus $T_{DOC\_BED}$ and space velocity (correlated to exhaust mass flow rate). The proper ratio of NO to NO2 is important to the function of both the DPF and the SCR system.

Because the operation of controlling the conversion of NO to NO2 across the DOC is particularly sensitive to the bed temperature of the DOC system 1200, a fuel consumption cost/response function 2230 is derived for fuel consumption as a function of NO/NOx ratio for the DOC system 1200. As discussed previously, using cost/response functions, the operation of the integrated system is optimized to achieve the best fuel consumption in view of the integrated system's predicted response to changes in its operating parameters. In particular, the engine-out HC and CO mass flow and the TIT are adjusted, by the integrated system optimizer 2050, where they are used as part of the overall control strategy to meet the optimization requirements.

FIG. 9 shows that SOI, quantity of fuel injection, the injector (SAC) pressure, injection rate shape, multiple injection, in-cylinder dosing, or any combination thereof may be adjusted to achieve a certain engine-out HC and CO mass flow. FIG. 9 also shows that, to a lesser degree (moderate influence), the variable geometry turbocharger (VGT), the EGR valve, intake throttle, exhaust throttle, and the intake valve may also be adjusted to achieve the engine-out HC and CO mass flow.

Moreover, FIG. 9 shows that SOI, quantity of fuel injection, the injector (SAC) pressure, injection rate shape, multiple injection, in-cylinder dosing, the variable geometry turbocharger (VGT), the EGR valve, intake throttle, exhaust throttle, the intake valve, the exhaust valve, or any combination thereof may be employed to adjust the turbine inlet temperature.

To determine the current state of the DPF system 1300, measurements 2310 are determined for the pressure difference across the filter (filter ΔP), exhaust mass flow rate, the filter bed temperature, the filter inlet temperature, and the filter inlet $NO/NO_2$ ratio.

A transfer function 2320, in the form of an embedded model, provides the soot load as a function of filter ΔP and exhaust mass flow rate. In addition, an embedded model provides the soot reduction (desoot) as a function of filter bed temperature, mass flow rate, filter inlet $NO/NO_2$ ratio, and filter inlet $O_2$ concentration. These models are developed as part of the engine system calibration development process. To those of skilled in the art, there are many ways to estimate or measure the soot loaded in the filter and the filter bed temperature.

Because the operation of the DPF system affects fuel consumption, i.e. fuel is used for regeneration of the filter, a cost/response function 2330 is derived for fuel consumption as a function of PM. As discussed previously, using cost/response functions, the operation of the integrated system is then optimized to achieve the best fuel consumption in view of the integrated system's predicted response to changes in its operating parameters. In particular, the DOC conversion of NO to NO2 and corresponding filter inlet temperature are adjusted by the integrated system optimizer 2050, where they are used as part of the overall control strategy to meet the optimization requirements.

FIG. 9 shows that SOI, quantity of fuel injection, multiple injections, or any combination thereof may be adjusted to achieve a certain engine-out HC and CO mass flow. FIG. 9 also shows that, to a lesser degree, the injector (SAC) pressure, injection rate shape, the variable geometry turbocharger (VGT), the EGR valve, intake throttle, exhaust throttle, and the intake valve may also be adjusted to achieve the filter inlet $NO/NO_2$ ratio and corresponding filter inlet temperature. As indicated previously, the embedded models above indicate how soot load and soot reduction respond to filter inlet NO/NO2 ratio and filter inlet temperature.

To determine the current state of the SCR system 1400, measurements 2410 are determined for the SCR bed temperature, exhaust mass flow rate, the SCR inlet $NO/NO_2$ ratio, urea flow rate (or other source of ammonia), ammonia storage, urea quality, and urea level.

A transfer function 2420, in the form of an embedded model, provides the SCR NOx conversion (deNOx) as a function of urea injected into the SCR system and SCR bed temperature, exhaust mass flow rate, and ammonia storage. In addition, an embedded model provides ammonia slip as a function of SCR bed temperature, exhaust mass flow rate, and ammonia storage and deNOx efficiency. These models are developed as part of the engine system calibration development process. To those skilled in the art, there are many ways to model SCR conversion efficiency and ammonia slip.

In a manner similar to the systems of FIGS. 1-6 described previously, the integrated system 1000 also takes into account the relative costs of urea and fuel. As indicated by a fuel consumption cost/response function 2430, it may be more advantageous to use more urea than fuel to achieve the NOx emissions, or vice versa. As such, the optimizer 2050 makes adjustments to the urea dosing. The embedded models are employed to determine the SCR system's response to a change in urea dosing, while ensuring that ammonia slip does not exceed a mandated threshold.

Thus, through the use of transfer functions 2220, 2320, 2420 described above, the optimizer receives information to allow it to determine the trade-offs in fuel consumption (as well as urea consumption) for each component of the integrated system to achieve the target emissions levels and performance targets. As such, the optimizer may optimize fuel and urea usage according to a NOx target and an ammonia slip target. On the other hand, the optimizer may maintain current fuel and urea consumption, but increase peak power at a NOx target and an ammonia slip target in response to ambient conditions or more favorable after-treatment current conditions. Alternatively, the optimizer may minimize trapped PM or regenerate. Or, the optimizer may reduce urea consumption in response to low urea tank levels or current unfavorable urea to diesel fuel cost per gallon.

When the method is applied for the integrated system under moderate to rapid transients, the transfer functions must be replaced with dynamic models which track the relevant time history of temperature and ammonia storage.

It should be readily understood by those persons skilled in the art that the present invention is susceptible of broad utility and application. Many embodiments and adaptations of the present invention other than those herein described, as well as many variations, modifications and equivalent arrangements, will be apparent from, or reasonably suggested, by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements.

What is claimed is:

1. A system for optimizing exhaust emissions from a combustion engine, the system comprising:
    a combustion engine producing engine exhaust emissions;
    at least one exhaust after-treatment device adapted to convert the engine exhaust emissions to converted exhaust emissions; and
    an optimizer adapted to adjust at least one operating parameter according to at least one cost/response function based on cost of consumption of fuel and cost of consumption of a reducing agent used for the exhaust after-treatment device,
    wherein at least one of the engine and the at least one after-treatment device responds to adjustment of the at least one operating parameter, and
    the at least one cost/response function provides a cost for a response to adjustment of the at least one operating parameter.

2. The system according to claim 1, wherein the exhaust emissions from the combination of the engine and the at least one after-treatment device is below target emissions levels after the optimizer adjusts the at least one operating parameter.

3. The system according to claim 1, wherein the response to adjustment of the at least one operating parameter is determined from at least one transfer function.

4. A method for optimizing exhaust emissions from a combustion engine, the method comprising:
    determining, from at least one transfer function, a response from at least one of a combustion engine and at least one after-treatment device to adjustment of at least one operating parameter;
    determining at least one cost/response function for each of the combustion engine and the at least one exhaust after-treatment device based on cost of consumption of fuel and cost of consumption of a reducing agent used for the exhaust after-treatment device,
    wherein the at least one cost/response function provides a cost for the response to adjustment of the at least one operating parameter; and
    adjusting the at least one operating parameter according to the at least one cost/response function.

5. The system according to claim 4, wherein, after the step of adjusting the at least one operating parameter, the exhaust emissions from the combination of the engine and the at least one after-treatment device is below target emissions levels.

* * * * *